US011021009B2

(12) United States Patent
Jimenez et al.

(10) Patent No.: US 11,021,009 B2
(45) Date of Patent: Jun. 1, 2021

(54) HUB CAP VENT SHIELD

(71) Applicant: STEMCO PRODUCTS, INC., Charlotte, NC (US)

(72) Inventors: Daniel T. Jimenez, Diana, TX (US); Herman E. Goins, Jr., Kilgore, TX (US); Mark N. Gold, Hallsville, TX (US); Lucia Santamaria, Katy, TX (US)

(73) Assignee: Stemco Products, Inc., Charlotte, NC (US)

( * ) Notice: Subject to any disclaimer, the term of this patent is extended or adjusted under 35 U.S.C. 154(b) by 0 days.

(21) Appl. No.: 16/606,719

(22) PCT Filed: Feb. 4, 2019

(86) PCT No.: PCT/US2019/016475
§ 371 (c)(1),
(2) Date: Oct. 18, 2019

(87) PCT Pub. No.: WO2019/156920
PCT Pub. Date: Aug. 15, 2019

(65) Prior Publication Data
US 2020/0369076 A1  Nov. 26, 2020

Related U.S. Application Data

(60) Provisional application No. 62/629,266, filed on Feb. 12, 2018.

(51) Int. Cl.
*B60B 7/04* (2006.01)
*B60B 7/00* (2006.01)

(52) U.S. Cl.
CPC .............. *B60B 7/002* (2013.01); *B60B 7/04* (2013.01)

(58) Field of Classification Search
CPC .................................. B60B 7/002; B60B 7/04
See application file for complete search history.

(56) References Cited

U.S. PATENT DOCUMENTS 3,316,022 A * 4/1967 Isenbarger .............. B60B 7/002
                                                    301/108.2
5,752,746 A * 5/1998 Perry ....................... B60B 7/00
                                                    301/108.1

(Continued)

FOREIGN PATENT DOCUMENTS

AU       687475 B2    7/1995
CN       1878681 A    3/2005

(Continued)

OTHER PUBLICATIONS

International Searching Authority, International Search Report and Written Opinion, PCT/US2019/016475, Applicant: Stemco Products, Inc., dated May 16, 2019, 7 pages.

*Primary Examiner* — Kip T Kotter
(74) *Attorney, Agent, or Firm* — Perkins Coie LLP

(57) ABSTRACT

A vent plug for a hub cap is provided. The vent plug includes a cover and base forming a chamber. A vent plug body extends from the base and forms a cavity. A shield is coupled to the vent plug body. The shield comprises an annularly extending disc that traverses the cavity. The shield includes a connecting surface to connect the shield to the vent plug body. The shield provides a lubrication/liquid barrier to inhibit lubrication (or other liquid) from entering the cavity formed by the vent plug body and the chamber. The connection between the shield and the vent plug body allows a gas (typically air) to vent past the shield into the cavity and, when pressure is sufficiently high, to the chamber and eventually atmosphere.

15 Claims, 5 Drawing Sheets

(56) References Cited

U.S. PATENT DOCUMENTS

| | | | | |
|---|---|---|---|---|
| 5,785,390 A | * | 7/1998 | Gold | B60B 7/00 301/108.1 |
| 5,860,708 A | * | 1/1999 | Borders | B60B 7/00 301/108.1 |
| 6,783,191 B1 | * | 8/2004 | Slesinski | B60B 7/002 301/108.1 |
| 7,156,890 B1 | * | 1/2007 | Thompson | B01D 46/0005 301/108.1 |
| 9,688,098 B2 | * | 6/2017 | Feicha | B60B 7/002 |
| 2004/0160115 A1 | | 8/2004 | Allsop | |
| 2016/0144659 A1 | * | 5/2016 | Yu | B60B 7/002 301/108.3 |
| 2019/0023065 A1 | * | 1/2019 | Foor | B60B 7/04 |

FOREIGN PATENT DOCUMENTS

| | | |
|---|---|---|
| CN | 203472406 U | 3/2014 |
| CN | 105531123 A | 1/2015 |
| CN | 205553763 U | 9/2016 |
| CN | 109069735 A | 12/2018 |
| DE | 102011117088 | 5/2013 |
| FR | 2915711 | 11/2008 |
| JP | 2012240598 A | 12/2012 |
| RU | 1696322 | 12/1991 |
| WO | 2005025893 A2 | 3/2005 |
| WO | 2015003892 A1 | 1/2015 |
| WO | 2017189161 A1 | 11/2017 |
| WO | 2019156920 | 8/2019 |

* cited by examiner

HUB CAP VENT SHIELD

CROSS-REFERENCE TO RELATED PATENT APPLICATIONS

The present application claims priority to U.S. Provisional Patent Application Ser. No. 62/629,266, filed Feb. 12, 2018, the disclosure of which is incorporated herein as if set out in full.

BACKGROUND

Vehicles, and especially heavy-duty vehicles such as tractors and trailers, have wheel ends assemblies that mount a rotating tire on a non-rotating axle or spindle. The wheel end assembly typically has a main body or hub that defines a cavity. The main body houses an inboard bearing, a fastening nut, and an outboard bearing assembly among other things.

The cavity of the main body contains a lubricant to facilitate operation of, for example, the bearings. The lubricant may be oil or grease. The main body may be bounded, on the outboard side, with a sight window such that the level of the oil or grease may be viewed and monitored. Lubricant may be added as necessary depending on the level shown in the one or more sight windows.

During operation, the lubricant heats. The heat can induce an increase in pressure within the cavity. Thus, it is desirable to provide a vent (sometimes referred to as a vent path) to allow pressure equalization between the cavity and the environment, which is typically the atmosphere.

Venting the wheel end assembly, however, has several drawbacks. One of the several drawbacks includes that the vent can provide a leak path allowing oil to egress to the environment. The vent also provides a leak path allowing foreign matter, such as, dirt, water, or the like, to ingress to the cavity. The foreign matter can foul the lubricant and potentially damage the parts of the wheel end assembly including, for example, the bearings. The vent is typically about the outboard end cap of the hub assembly and may be in a plug in the end cap where the plug has a vent path, sometimes referred to as a vent plug.

To inhibit ingress of foreign matter and egress of oil, the vent path, whether in a plug or not, may provide a labyrinth or tortuous path between the cavity and the environment, or atmosphere. The vent may also include a diaphragm or valve that normally isolates the cavity from the atmosphere but places the cavity and atmosphere in fluid communicate (via the vent) when the pressure in the cavity exceeds a predefined threshold.

Improvements to the vent, however, are desirable. Thus, against this background, an improved vent is provided.

SUMMARY

This Summary is provided to introduce a selection of concepts in a simplified form that are further described below in the Detailed Description. This Summary, and the foregoing Background, is not intended to identify key aspects or essential aspects of the claimed subject matter. Moreover, this Summary is not intended for use as an aid in determining the scope of the claimed subject matter.

In some aspects of the technology, a vent plug for a hub cap is provided. The vent plug includes a cover and base forming a chamber. A vent plug body extends from the base and forms a cavity. The base has at least an aperture to receive a valve. The valve selectively opens and closes to place the cavity in fluid communication with the chamber. A shield is coupled to the vent plug body. The shield comprises an annularly extending disc that traverses the cavity. The shield includes a connecting surface to connect the shield to the vent plug body. The shield provides a lubrication/liquid barrier to inhibit lubrication (or other liquid) from entering the cavity formed by the vent plug body and the chamber. The connection between the shield and the vent plug body allows a gas (typically air) to vent past the shield into the cavity and, when pressure is sufficiently high, to the chamber and eventually atmosphere.

These and other aspects of the present system and method will be apparent after consideration of the Detailed Description and Figures herein.

DRAWINGS

Non-limiting and non-exhaustive embodiments of the present invention, including the preferred embodiment, are described with reference to the following figures, wherein like reference numerals refer to like parts throughout the various views unless otherwise specified.

DETAILED DESCRIPTION

The technology of the present application will now be described more fully below with reference to the accompanying figures, which form a part hereof and show, by way of illustration, specific exemplary embodiments. These embodiments are disclosed in sufficient detail to enable those skilled in the art to practice the technology of the present application. However, embodiments may be implemented in many different forms and should not be construed as being limited to the embodiments set forth herein. The following detailed description is, therefore, not to be taken in a limiting sense.

The technology of the present application is described with specific reference to a hub cap with a vent plug for a steer or trailer. However, the technology described herein may be used for other vehicles wheel ends, such as, for example, tractors, cars, airplane landing gear, and the like. The technology also can be used to vent drive axles. Moreover, the technology of the present application will be described with relation to exemplary embodiments. The word "exemplary" is used herein to mean "serving as an example, instance, or illustration." Any embodiment described herein as "exemplary" is not necessarily to be construed as preferred or advantageous over other embodiments. Additionally, unless specifically identified otherwise, all embodiments described herein should be considered exemplary.

Figure 1:
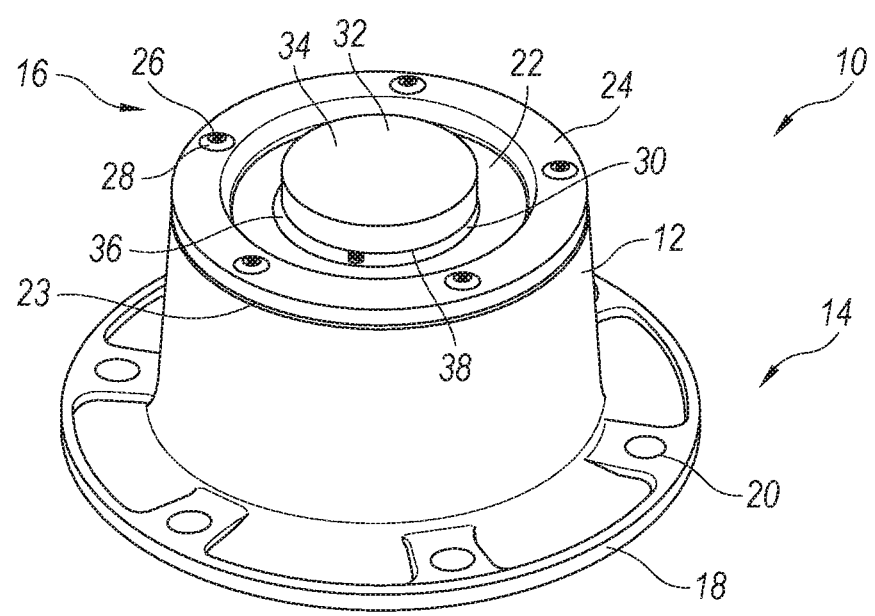
FIG. 1 shows a perspective view of a hub cap consistent with the technology of the present application.

A hub cap 10 is shown in FIG. 1. The hub cap 10 as shown is a hub cap that is currently available from Stemco Products, Inc. The hub cap 10 as shown has a generally cylindrical body 12 with an inboard side 14 and an outboard side 16. The inboard side 14 has a flanged surface 18 having a plurality of bolt holes 20 to allow the hub cap 10 to be bolted to the wheel end. The outboard side 16 has a sight glass 22 and an end ring 24. The end ring 24 has bores 26 that receive fasteners 28 to couple the end ring 24, sight glass 22, and seals 23 to the outboard side 16 of the hub cap 10. The fasteners may be rivets, screws, pins, or the like. In some embodiments, the end ring 24 and sight glass 22 may be integral with the outboard side 16 of the hub cap 10, which would remove the need for the bores 26, fasteners 28, and seals.

The sight glass 22 and end ring 24 provide an aperture 30. A vent plug 32 is provided in the aperture 30. The vent plug 32 has a cover 34 that is coupled to a base 36. The junction of the cover 34 and base 36 is at an interface 38. As can be appreciated, the vent plug 32 is located at the geometric center of the hub cap 10. In other embodiments, the vent plug 32 may be located off-center. In still other embodiments, a plurality of vent plugs may be provided at symmetrical or asymmetrical locations.

Figure 2:
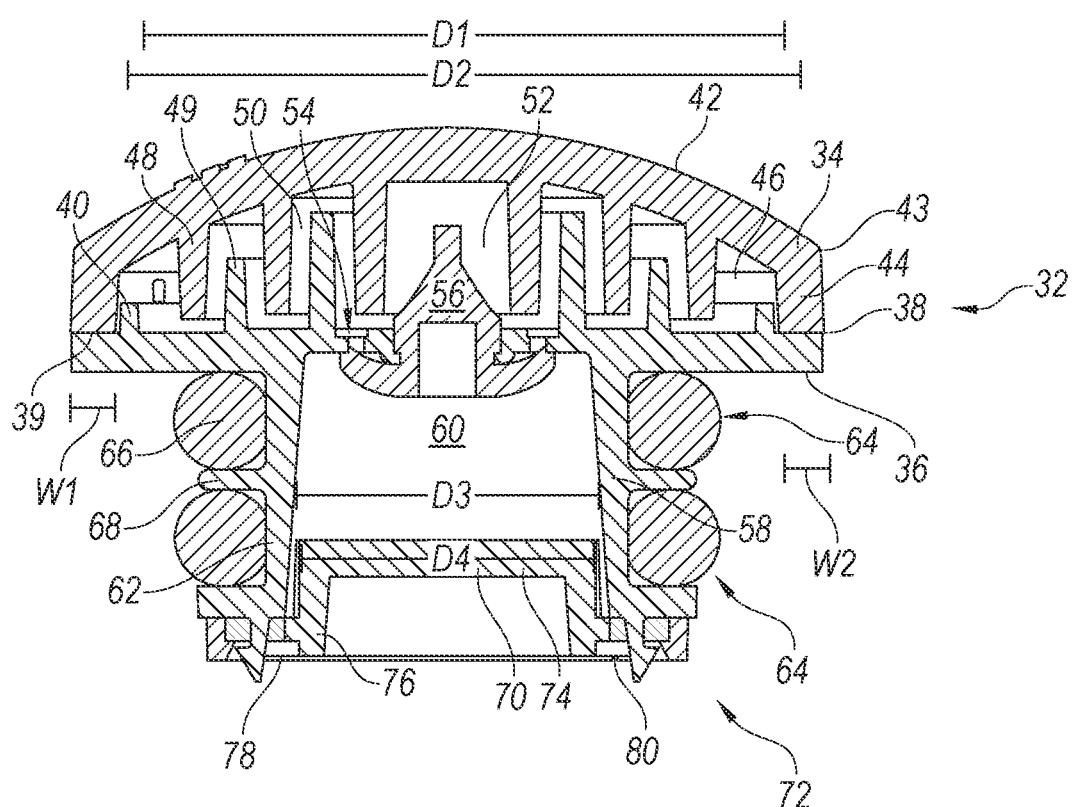
FIG. 2 shows a cross sectional view of the vent plug of FIG. 1 consistent with the technology of the present application.

FIG. 2 shows a cross sectional view of the vent plug 32 in isolation. The vent plug has the cover 34 coupled to the base 36. The base 36 has an outer edge surface 39 and a boarder wall 40 that form a shelf or ledge. The outer edge surface 39 has a width W1. The boarder wall 40 has an outer diameter D1. The cover 34 has a concave dome 42 and a rim 44 at the outer edge 43 of the dome 42. The rim 44 has a width W2. The rim 44 has an inner diameter D2 slightly smaller than the outer diameter D1 such that a frictional engagement is maintained between the boarder wall 40 and the rim 44 to hold the cover 34 to the base 36. However, as shown in FIG. 2, the inner diameter D2 of the rim 44 may be slightly stretched to be greater than the outer diameter D1 when installed to form the interference fit. An interface 38 between the cover 34 and the base 36 is formed by the boarder wall 40, outer edge surface 39, and the rim 44. Notice, in certain aspects, the cover 34 and the base 36 may be a single unit. If formed as a monolithic or single unit, the interface 38 may be replaced with perforations or the like. While shown as a friction fit, the cover 34 and the base 36 could be coupled using other coupling techniques such as, for example, welding (sonic or heat), adhering, gluing, curing, or the like.

The cover 34 and the base 36 define a chamber 46. The cover 34 has a plurality of ribs 48, defining concentric rings, that extend into the chamber 46 towards the base 36. The base 36 has a plurality of ribs 49, defining concentric rings, that extend into the chamber 46 towards the cover 34. The ribs 48 of the cover 34 and the ribs 49 of the base 36 are generally alternating and define a labyrinth path 50 between a central aperture 52 in the base 36 and the interface 38. The labyrinth path 50 provides a tortuous vent path that allows gas to travel relatively freely, but inhibits liquids from leaking through the path, which inhibits the lubrication from exiting to the atmosphere. The base 36 further includes radially outward spaced apart apertures 54. The spaced apart apertures 54 allow air to vent into the lubrication cavity of the wheel end to inhibit the creation of a vacuum as the bearings and lubrication cool during periods of non-use.

A valve 56 resides in the central aperture 52. The valve 56 is an elastic member and typically formed of an elastomeric. The valve 56 is further described in U.S. Pat. No. 5,860,708, issued Jan. 19, 1999, which is owned by Stemco, the disclosure of which is incorporated herein by reference as if set out in full. Generally, the valve 56 is designed such that the vent is normally closed until the pressure in the wheel end increases due to operation (or other reasons). When pressure exceeds a set point, the valve opens to allow pressure to vent.

The base 36 is coupled to the vent plug body 58. The vent plug body 58 extends in an inboard direction from the base 36 forming a generally cylindrical, hollow cavity 60. The vent plug body 58 defines an inner diameter D3 although the vent plug body 58 may be cylindrical or frustoconical as shown. The outer surface 62 of the vent plug body 58 forms one or more annular glands 64, of which two annular glands 64 are shown. Seals 66, such as o-rings, form a seal between the vent plug 32 and the hub cap 10, more specifically, the sight glass 22. The annular glands 64 are generally formed with a portion of the vent plug body 58 forming the base of the annular gland 64 and one or more radially extending, annular ribs 68 forming walls of the annular gland 64.

Figure 3:
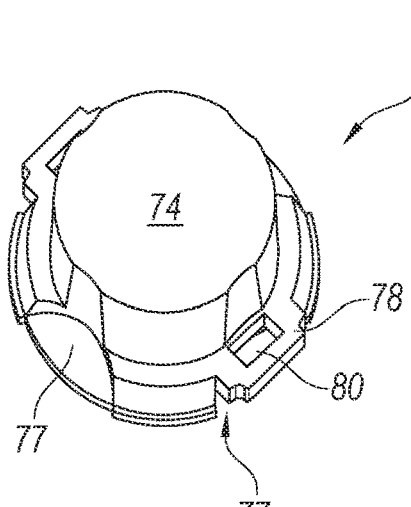
FIG. 3 shows a perspective view of a shield for the vent plug of FIG. 1 consistent with the technology of the present application.

A shield 70 is coupled to the inboard side 72 of the vent plug body 58, which is distal to the base 36. The shield 70, as shown in FIG. 2, has a radially extending disc body 74 and an axially extending connector ring 76 with a radially extending annular connecting surface 78. The disc body 74 has a shape to cooperatively work with the shape of the vent plug body 59. The radially extending annular connecting surface 78 has one or more bores 80. The radially extending disc body 74 has a diameter D4 slightly less than the corresponding diameter D3 of the vent plug body 58. FIG. 3 shows a perspective view of the vent shield 70. The disc body 74 and the connector ring 76 are generally solid to inhibit lubricant from traversing from the lubrication cavity of the wheel end assembly to the cavity 60 of the vent plug 32. The connector ring 76 may have cutouts 77 to facilitate a gas vent path.

Figure 6:
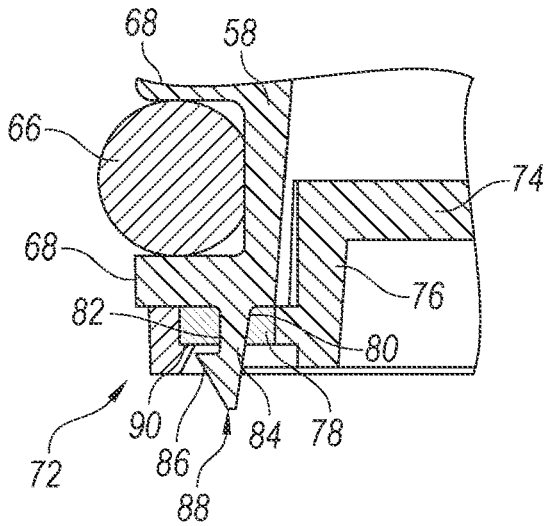
FIG. 6 shows a cross section of a detail for connecting a shield and a vent plug body consistent with the technology of the present application.

With reference back to FIG. 2 and FIG. 6, the inboard side 72 of the vent plug body 58 provides connector protrusions 82. The connector protrusions 82 have an axially extending leg 84 and a radially extending ledge 86. The connector protrusions 82 align with the bores 80 in connecting surface 78. The terminal end 88 of the connector protrusions 82 may be tapered or chamfered to facilitate inserting the connector protrusions 82 into the bores 80. Once the ledge 86 clears the bore 80, the elastic connector protrusion 82 moves the ledge 86 to engage the underside 90 of the connecting surface 78 forming a snap fit connection in this exemplary embodiment. While a snap fit connection is shown in this exemplary embodiment as a means for connecting the shield to the vent plug body, the connection between the shield 70 and the vent plug body 58 may be formed by alternative means, such as, for example, a friction fitting, adhesive, glues, welds 205, or the like. Moreover, the shield may be molded 205 with the vent plug body to form a monolithic piece.

As can be appreciated, the shield 70 connection to the vent plug body 58 provides a leak path for gas (air) from the inboard wheel end to the vent plug body 58, and eventually to atmosphere through interface 38.

Figure 4:
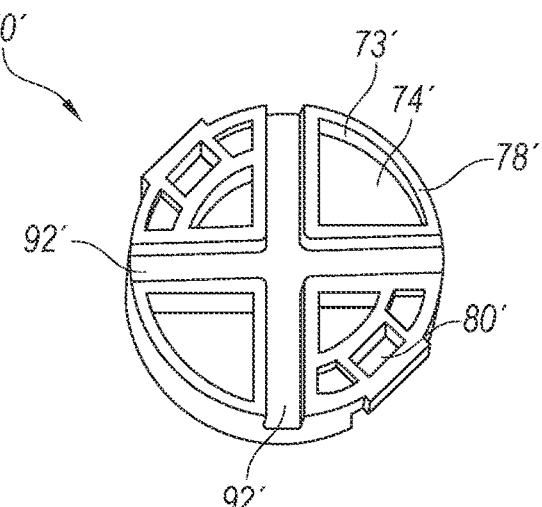
FIG. 4 shows a perspective view of a shield for the vent plug of FIG. 1 consistent with the technology of the present application.

FIG. 4 shows an alternative version of the shield 70'. Shield 70' has a radially extending disc portion 74' and a radially extending annular connector surface 78' extending from an edge 73' of the disc portion 74'. The connector surface 78' may include bores 80' to receive the connector protrusions 82. The shield 70' includes vent channels 92' to facilitate air flow. The vent channels 92' may be incorporated into other shields described herein.

Figure 5A:
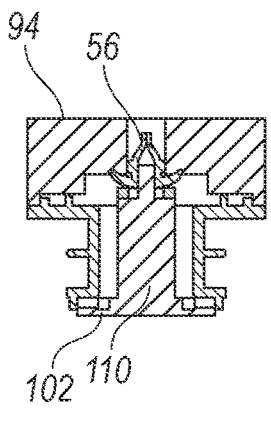
FIGS. 5A-5D show cross sectional views of exemplary vent plugs with shields consistent with the technology of the present application.
Figure 5B:
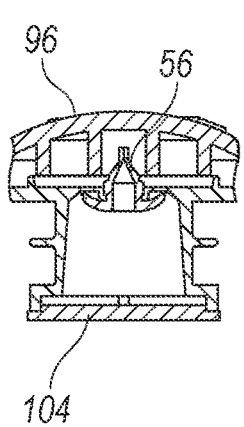
Figure 5C:
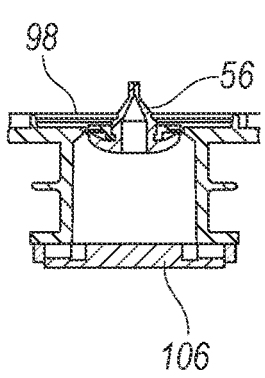
Figure 5D:
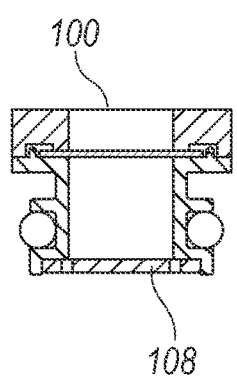

FIGS. 5A-D5 show alternative vent plugs 94, 96, 98, and 100 with a shield 102, 104, 106, and 108. As shown, vent plugs 94, 96, and 98 provide a valve 56 but as shown by vent plug 100, a valve 56 is not a necessary component of the vent plug. The shields 70, 70', 102, 104, 106, and 108 inhibit the flow of lubricant into the vent plug body 58. The shield 102 includes an axially extending central member 110 that engages with the valve 56.

Figures 7A, 7B:
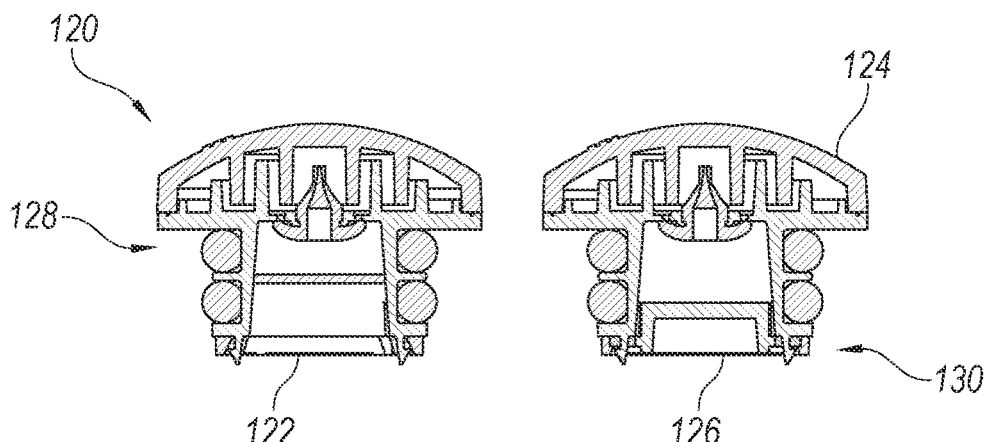
FIGS. 7A and 7B show cross sectional views of vent plug with shields consistent with the technology of the present application.

FIGS. 7A and 7B show a vent plug 120 with a shield 122 and a vent plug 124 with a shield 126. Placement of the shield 122 inside the vent plug body is shown towards the middle or outboard end 128 of the vent plug 120. The specific placement of the shield 122 may vary depending on the characteristics and/or material of the vent plug 120. Placement of shield 126 in vent plug 124 is toward the inboard end 130. In other words, the placement of the various shields described herein may be optimized for the particular construction of the vent plug.

Figure 8:
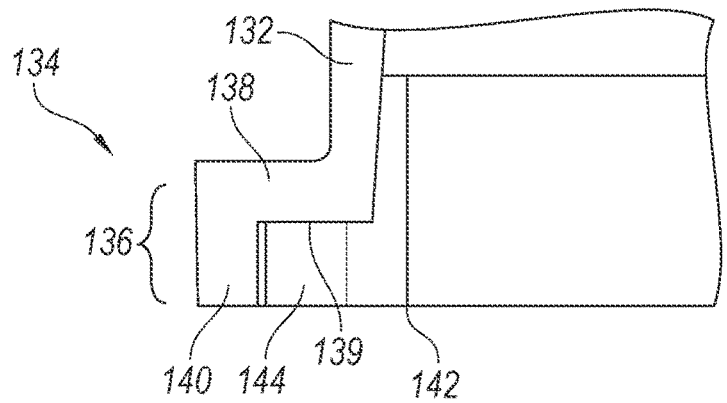
FIG. 8 shows a cross section view of a detail for connecting a shield and a vent plug body consistent with the technology of the present application.

FIG. 8 shows a detail of means for connecting the vent plug body to the shield. A portion of a vent plug body 132 is shown. The vent plug body 132 terminates, at the inboard side 134, with a shoulder 136. The shoulder 136 is formed by a radially extending annular surface 138 and an axially extending annular rim 140. The shield 142 has a radially extending annular ledge 144 that mates with the shoulder 136 and forms a junction 139. The shield 142 is coupled, in this exemplary embodiment, to the vent plug body 132 by a weld at points along junction 138.

Figure 9:
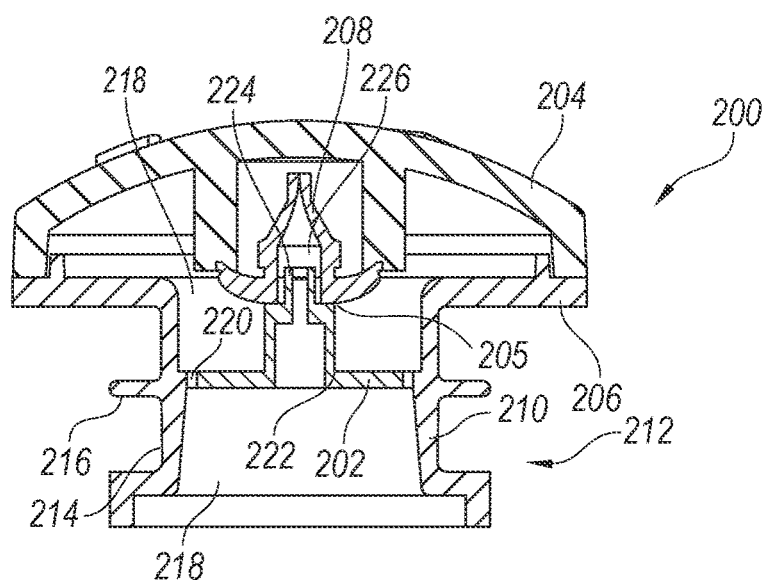
FIG. 9 shows a cross section of a vent plug with a shield consistent with the technology of the present application.

FIG. 9 provides an alternative construction of a vent plug 200 with a shield 202. The vent plug 200 includes a cover 204 and a base 206. The cover 204 and base 206 would have annular concentric rings as described above, but not shown here, to provide a labyrinth seal. The vent plug 200 includes a valve 208, which is similar to the valve 56 described above.

The vent plug 200 further includes an annular vent plug body 210 extending in an inboard direction from the base 206. The vent plug body 210 includes one or more annular glands 212, which are formed in part by an outer surface 214 of the vent plug body 210 and radially extending, annular rib 216. The shield 202 traverses the space 218 defined by the vent plug body 210. The shield 202 has perforations 220 that provide a vent path from the wheel end lubrication cavity to the space 218. While the shield 202 may be a disc that traverses the space 218, the exemplary shield 202 shown provides a central member 222 extending in an axial, outboard direction. The central member 222 is shown as a cylindrical member with a distal protrusion 224 that is sized to fit within a bore 226 of the valve 208. The central member 222 and protrusion 224 fitting within the bore 226 of the valve 208 provides for support among other things from the shield 202.

Figure 10:
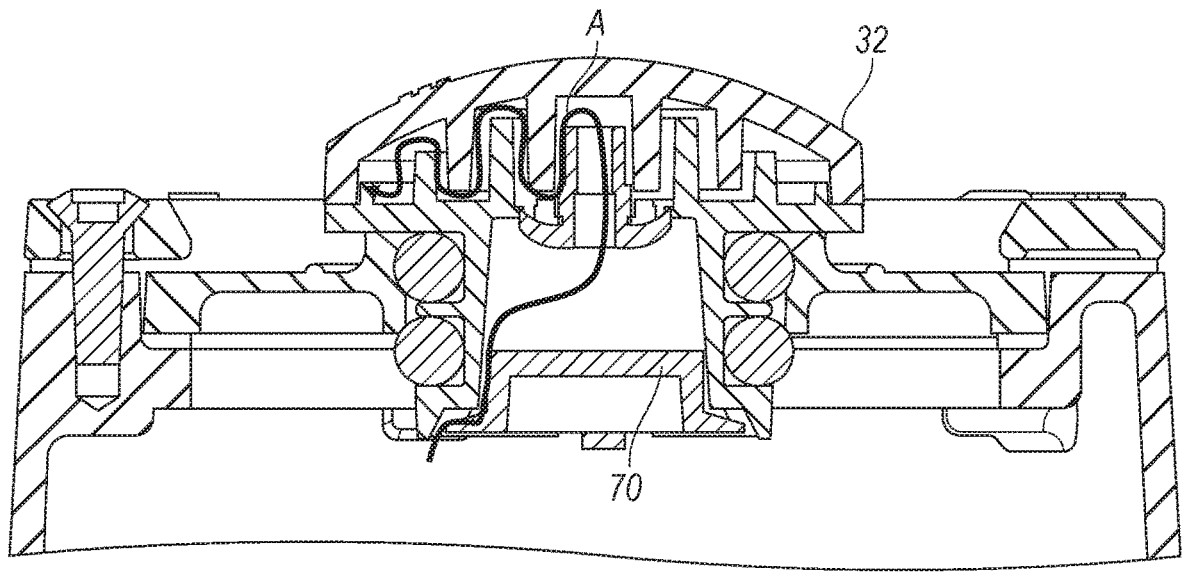
FIG. 10 shows a cross section of a vent plug with a shield consistent with the technology of the present application.
Figure 11:
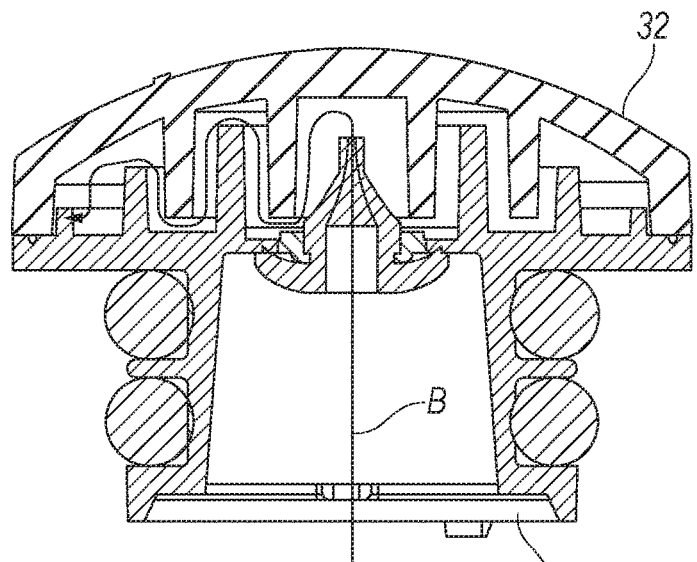
FIG. 11 shows a cross section of a vent plug with a shield consistent with the technology of the present application.

The vent plugs with shields, as described herein, generally provide a liquid barrier and a gas vent path. FIG. 10 shows an exemplary vent path A for a vent plug 32 having a shield 70. FIG. 11 shows an exemplary vent path B for a vent plug 32 having a shield 70'.

Although the technology has been described in language that is specific to certain structures and materials, it is to be understood that the invention defined in the appended claims is not necessarily limited to the specific structures and materials described. Rather, the specific aspects are described as forms of implementing the claimed invention. Because many embodiments of the invention can be practiced without departing from the spirit and scope of the invention, the invention resides in the claims hereinafter appended. Unless otherwise indicated, all numbers or expressions, such as those expressing dimensions, physical characteristics, etc. used in the specification (other than the claims) are understood as modified in all instances by the term "approximately." At the very least, and not as an attempt to limit the application of the doctrine of equivalents to the claims, each numerical parameter recited in the specification or claims which is modified by the term "approximately" should at least be construed in light of the number of recited significant digits and by applying ordinary rounding techniques. Moreover, all ranges disclosed herein are to be understood to encompass and provide support for claims that recite any and all subranges or any and all individual values subsumed therein. For example, a stated range of 1 to 10 should be considered to include and provide support for claims that recite any and all subranges or individual values that are between and/or inclusive of the minimum value of 1 and the maximum value of 10; that is, all subranges beginning with a minimum value of 1 or more and ending with a maximum value of 10 or less (e.g., 5.5 to 10, 2.34 to 3.56, and so forth) or any values from 1 to 10 (e.g., 3, 5.8, 9.9994, and so forth).

What is claimed is:

1. A vent plug for a hub cap comprising,
   a cover;
   a base coupled to the cover and defining an interface, the base being inboard of the cover;
   a chamber between and defined by the cover and the base;
   an annular vent plug body extending in an inboard direction from the base where the base and the annular vent plug body define a hollow cavity;
   a shield coupled to the vent plug body and inboard of the base, the shield generally traversing the hollow cavity defined by the annular vent plug body, wherein
   a vent path configured to place a lubrication cavity of a wheel end assembly in fluid communication with the hollow cavity that inhibits liquid leaking between the wheel end assembly and the hollow cavity of the vent plug.

2. The vent plug of claim 1 wherein the shield comprises a radially extending disc body.

3. The vent plug of claim 2 wherein the vent path comprises a bore located in the radially extending disc body.

4. The vent plug of claim 2 wherein the shield comprises an axially extending connector ring.

5. The vent plug of claim 4 wherein the connector ring comprises an annular connecting surface having at least one bore.

6. The vent plug of claim 5 wherein the vent plug body comprises at least one connector protrusion shaped to form a connection with the at least one bore.

7. The vent plug of claim 6 wherein the at least one connector protrusion comprises an elastic leg and a radially extending ledge to engage the underside of the annular connecting surface.

8. The vent plug of claim 2 wherein the radially extending disc body comprises vent channels.

9. A vent plug for a hub cap comprising,
a base;
a vent plug body that defines a cavity, the vent plug body having an outboard side proximal the base and an inboard side distal the base;
a shield comprising at least a radially extending disc coupled to the vent plug body and inboard of the base, the shield generally traversing the cavity defined by the vent plug body, wherein the shield comprises at least one bore and wherein the inboard side of the vent plug body comprises at least one connector protrusion configured to engage the at least one bore; and
a vent path configured to place a lubrication cavity of a wheel end assembly in fluid communication with the cavity of the vent plug and an atmosphere, wherein the vent path is configured to allow gas to vent from the lubrication cavity to the cavity and through the base to atmosphere and configured to inhibit liquid leaking between the lubrication cavity and the cavity of the vent plug.

10. The vent plug of claim 9 comprising at least one aperture in the base and a valve retained in the at least one aperture of the base and configured such that the valve is in fluid communication with the cavity.

11. The vent plug of claim 10 wherein the valve is configured to open when the cavity exceeds a pressure threshold to place the cavity in gaseous fluid communication with the atmosphere.

12. The vent plug of claim 9 wherein the radially extending disc comprising a plurality of vent channels.

13. A vent plug for a hub cap comprising:
a cover;
a base, wherein the cover is outboard of and coupled to the base;
a vent plug body that defines a cavity, the vent plug body having an outboard side proximal the base and an inboard side distal the base;
a shield comprising at least a radially extending disc coupled to the vent plug body and inboard of the base, the shield generally traversing the cavity defined by the vent plug body; and
a vent path configured to place a lubrication cavity of a wheel end assembly in fluid communication with the cavity of the vent plug and an atmosphere, wherein the vent path is configured to allow gas to vent from the lubrication cavity to the cavity and through the base to atmosphere and configured to inhibit liquid leaking between the lubrication cavity and the cavity of the vent plug.

14. The vent plug of claim 13 where the cover and the base define a chamber.

15. The vent plug of claim 14 wherein the cover comprises a plurality of cover ribs extending from the cover towards the base and the base defines a plurality of base ribs extending from the base towards the cover wherein the plurality of cover ribs are offset from the plurality of base ribs such that the vent path is defined in part by a labyrinth path through the plurality of cover ribs and the plurality of base ribs in the chamber.

* * * * *